(12) United States Patent
Martin et al.

(10) Patent No.: US 10,768,628 B2
(45) Date of Patent: Sep. 8, 2020

(54) SYSTEMS AND METHODS FOR OBJECT DETECTION AT VARIOUS RANGES USING MULTIPLE RANGE IMAGERY

(71) Applicant: UATC, LLC, San Francisco, CA (US)

(72) Inventors: R. Lance Martin, Half Moon Bay, CA (US); Zac Vawter, Sunnyvale, CA (US); Andrei Pokrovsky, San Francisco, CA (US)

(73) Assignee: UATC, LLC, San Francisco, CA (US)

( * ) Notice: Subject to any disclaimer, the term of this patent is extended or adjusted under 35 U.S.C. 154(b) by 160 days.

(21) Appl. No.: 15/992,498

(22) Filed: May 30, 2018

(65) Prior Publication Data
US 2019/0179327 A1 Jun. 13, 2019

Related U.S. Application Data

(60) Provisional application No. 62/597,450, filed on Dec. 12, 2017.

(51) Int. Cl.
*G06K 9/00* (2006.01)
*G05D 1/02* (2020.01)
(Continued)

(52) U.S. Cl.
CPC .......... *G05D 1/0221* (2013.01); *G05D 1/0231* (2013.01); *G06K 9/00805* (2013.01); *G06K 9/627* (2013.01); *G06T 7/70* (2017.01); *G05D 2201/0213* (2013.01); *G06T 2207/10004* (2013.01); *G06T 2207/10141* (2013.01);
(Continued)

(58) Field of Classification Search
CPC . G06T 2207/20081; G06T 2207/10141; G06T 2207/10004; G06T 2207/30252; G06T 7/70; G05D 1/0221; G05D 1/0231; G05D 2201/0213; G06K 9/00805; G06K 9/627
See application file for complete search history.

(56) References Cited

U.S. PATENT DOCUMENTS

2017/0371348 A1* 12/2017 Mou ................ G01S 17/86
2018/0173971 A1* 6/2018 Jia ................... G06K 9/6288

* cited by examiner

*Primary Examiner* — Amara Abdi
(74) *Attorney, Agent, or Firm* — Dority & Manning, P.A.

(57) ABSTRACT

Systems and methods are directed to object detection at various ranges for autonomous vehicles. In one example, a system includes a camera providing a first field of view; a machine-learned model that has been trained to generate object detection range estimates based at least in part on labeled training data representing image data having a second field of view different from the first field of view; and a computing system including one or more processors; and memory including instructions that, when executed by the one or more processors, cause the one or more processors to perform operations. The operations include obtaining image data from the camera. inputting the image data from the camera to the machine-learned model; obtaining a first range estimate as an output of the machine-learned model, wherein the first range estimate represents estimates for the second field of view; generating transformed range estimate by applying a range estimate transform to the first range estimate output from the machine-learned model; and providing the transformed range estimate for use in controlling operation of an autonomous vehicle.

17 Claims, 7 Drawing Sheets

(51) Int. Cl.
*G06T 7/70* (2017.01)
*G06K 9/62* (2006.01)
(52) U.S. Cl.
CPC ............... *G06T 2207/20081* (2013.01); *G06T 2207/30252* (2013.01)

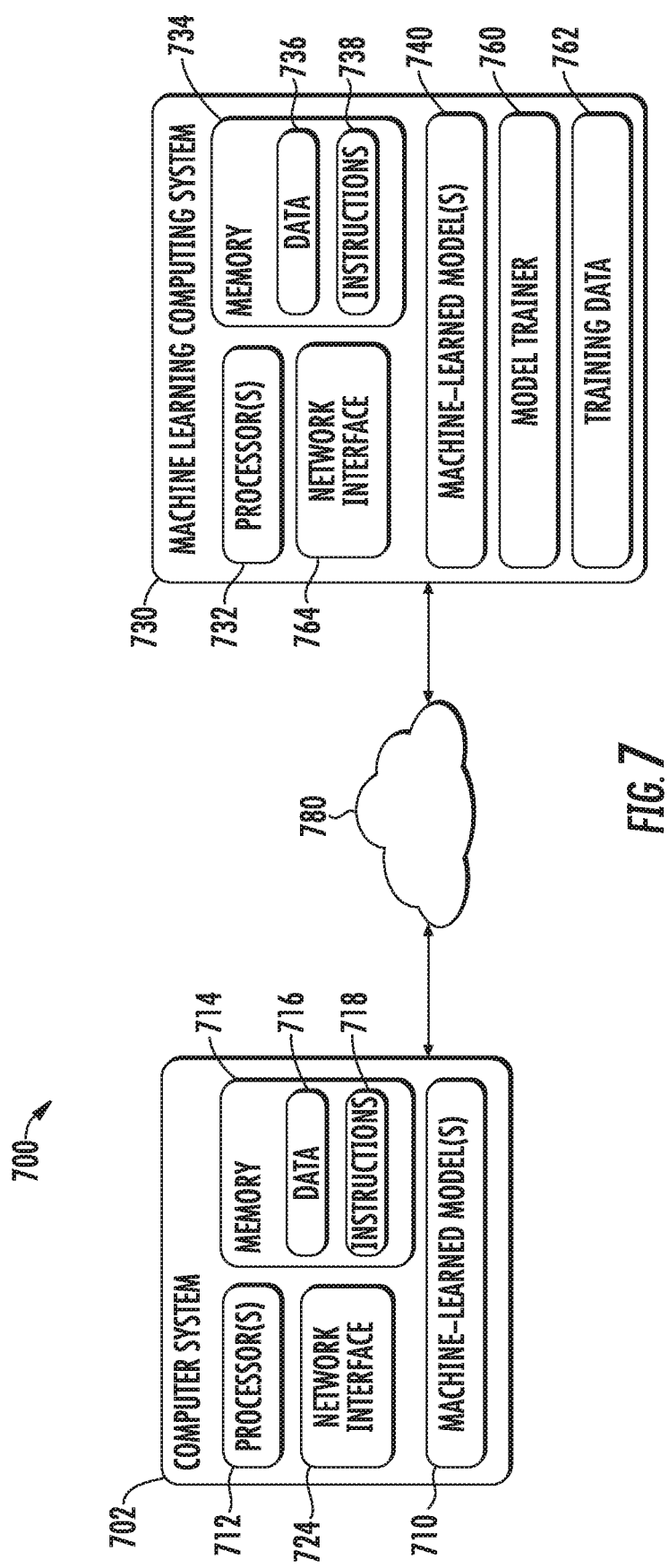

SYSTEMS AND METHODS FOR OBJECT DETECTION AT VARIOUS RANGES USING MULTIPLE RANGE IMAGERY

The present application is based on and claims the benefit of U.S. Provisional Application 62/597,450 having a filing date of Dec. 12, 2017, which is incorporated by reference herein.

FIELD

The present disclosure relates generally to autonomous vehicles. More particularly, the present disclosure relates to systems and methods that provide for object detection at various ranges for autonomous vehicle operation.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether.

SUMMARY

Aspects and advantages of embodiments of the present disclosure will be set forth in part in the following description, or can be learned from the description, or can be learned through practice of the embodiments.

One example aspect of the present disclosure is directed to a system. The system includes a camera providing a first field of view; a machine-learned model that has been trained to generate object detection range estimates based at least in part on labeled training data representing image data having a second field of view different from the first field of view; and a computing system. The computing system includes one or more processors; and memory including instructions that, when executed by the one or more processors, cause the one or more processors to perform operations. The operations include obtaining image data from the camera. The operations further include inputting the image data from the camera to the machine-learned model. The operations further include obtaining a first range estimate as an output of the machine-learned model, wherein the first range estimate represents estimates for the second field of view. The operations further include generating transformed range estimate by applying a range estimate transform to the first range estimate output from the machine-learned model. The operations further include providing the transformed range estimate for use in controlling operation of an autonomous vehicle.

Another example aspect of the present disclosure is directed to a computer-implemented method for executing a lane change by an autonomous vehicle. One example aspect of the present disclosure is directed to a computer-implemented method for object detection. The method includes obtaining, by a computing system comprising one or more computing devices, image data from a camera providing a first field of view. The method further includes inputting, by the computing system, the image data from the camera to a machine-learned model that has been trained to generate object detection range estimates based at least in part on labeled training data representing image data having a second field of view different from the first field of view. The method further includes obtaining, by the computing system, a first range estimate as an output of the machine-learned model, wherein the first range estimate represents an estimate for the second field of view. The method further includes generating, by the computing system, a transformed range estimate by applying a range estimate transform to the first range estimate output from the machine-learned model. The method further includes providing, by the computing system, the transformed range estimate to a motion planning system for use in determining operation of an autonomous vehicle.

Another example aspect of the present disclosure is directed to an autonomous vehicle. The autonomous vehicle includes a camera providing a first field of view; a machine-learned model that has been trained to generate object detection range estimates based at least in part on labeled training data representing image data having a second field of view different from the first field of view; and a vehicle computing system. The vehicle computing system includes one or more processors; and memory including instructions that, when executed by the one or more processors, cause the one or more processors to perform operations. The operations include obtaining image data from the camera. The operations further include inputting the image data to the machine-learned model. The operations further include obtaining a first range estimate as an output of the machine-learned model, wherein the first range estimate represents an estimate for the second field of view. The operations further include obtaining a range estimate transform. The operations further include generating a transformed range estimate by applying the range estimate transform to the first range estimate output from the machine-learned model. The operations further include providing the transformed range estimate to a motion planning system for use in determining operation of the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 7 depicts a block diagram of an example computing system according to example embodiments of the present disclosure.

DETAILED DESCRIPTION

Figure 1:
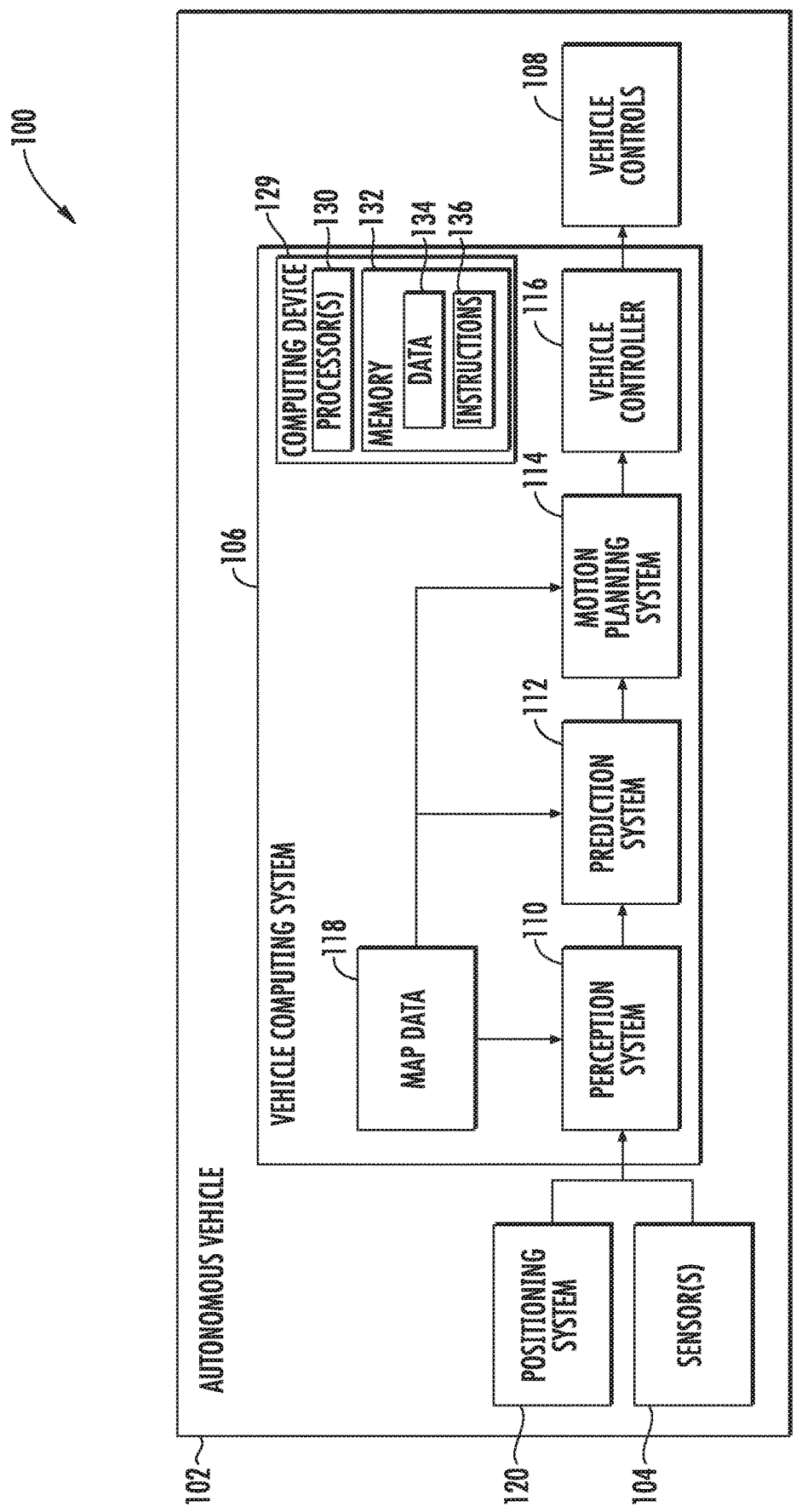
FIG. 1 depicts a block diagram of an example system for controlling the navigation of a vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to providing object detection at various ranges for an autonomous vehicle. In particular, the systems and methods of the present disclosure can include and/or leverage machine-learned models to provide longer range object detection for use in determining and controlling autonomous vehicle operation. In particular, machine-learned models can be trained using, e.g., image data from a particular camera for which training data is readily available. The machine-learned models can then be configured to receive as input image data from a narrower field of view (e.g., angular field of view) camera to perform object detection and/or generate estimates for distance or range to objects identified within the image data based on the wide field of view, and then these estimates can be transformed to true estimates for the narrow field of view. For example, the camera used in operation may have a larger focal length than the camera used for generating the training data.

Various embodiments herein are described in the context of providing longer range object detection simply for the purpose of illustrative non-limiting example. However, it will be appreciated that alternative embodiments can include using, during operation, a camera having a wider field of view in comparison with the field of view associated with the training data. Further yet, example embodiments include using, during operation, a camera having a variable field of view, while the machine-trained model was trained using a training data associated with a fixed field of view.

An autonomous vehicle can drive, navigate, operate, etc. with minimal and/or no interaction from a human driver to provide a vehicle service. In this way, the vehicle can perform at least some operations without human intervention. By way of example, an autonomous vehicle can be an autonomous truck that is configured to autonomously navigate to deliver a shipment to a destination location. In order to autonomously navigate, the autonomous truck can include a plurality of sensors (e.g., a LIDAR system, cameras, etc.) configured to obtain sensor data associated with the autonomous vehicle's surrounding environment. The autonomous truck can also include a vehicle computing system configured to detect and classify objects in the sensor data, as well as determine a distance or range to the objects for use in generating a motion plan for controlling operation of the autonomous truck. In particular, to effectively operate a vehicle autonomously, for example, on a highway, it may be necessary to detect and identify objects (e.g., other vehicles, etc.) at long distances ahead of the autonomous vehicle. For example, an autonomous vehicle, such as an autonomous truck, may need to be able to identify and respond to objects at distances of 100 to 200 meters or more ahead of the autonomous vehicle to operate efficiently and safely.

LIDAR range may generally be more limited than is desired for long range object detection. For example, LIDAR data may generally allow for detecting and identifying objects out to about 50 to 80 meters. However, to operate an autonomous vehicle, such as an autonomous truck, efficiently and safely it may be desirable to detect and identify objects (e.g., vehicles) out to 100 to 300 meter ranges, for example. The systems and methods of the present disclosure can provide such longer range object detection using camera image data.

In accordance with the present disclosure, sensors, such as one or more cameras, on board the autonomous truck can be configured to capture sensor data, such as image data, at long ranges ahead of the autonomous truck. Additionally, the vehicle computing system of the autonomous truck can be configured to process the captured image data to identify a plurality of objects in the image data as well as how far away those objects may be from the autonomous truck. As an example, in some implementations, a vehicle computing system can include one or more machine-learned models that can receive as input image data that depicts one or more objects (e.g., vehicles, etc.) in the surrounding environment of the autonomous truck (e.g., at some distance ahead of the autonomous truck, etc.) and provide as output estimates of distance or range from the autonomous vehicle (e.g., autonomous truck, etc.) to one or more objects identified in the image data.

In particular, according to the present disclosure, the machine-learned model(s) can be trained using image data from a first type of camera (e.g., a wide field of view camera, etc.) for which training data (e.g., labeled ground truth range data, etc.) is readily available. The machine-learned models can then be configured to receive as input image data from a second type of camera (e.g., a narrow field of view camera, etc.) and generate estimates for distance or range to objects identified within the image data as output of the model(s). In accordance with the present disclosure, the model output distance estimates can be transformed from an initial distance estimate based on distances learned using the first type of camera training data (e.g., wide field of view camera, etc.) to an actual distance estimate based on a relationship (e.g., transform) between the first type of camera (e.g., wide field of view camera, etc.) and the second type of camera (e.g., narrow field of view camera, etc.).

More particularly, an autonomous vehicle (e.g., a ground-based vehicle, air-based vehicle, or other vehicle type) can include a variety of systems onboard the autonomous vehicle to control the operation of the vehicle. For instance, the autonomous vehicle can include one or more data acquisition systems (e.g., sensors, image capture devices), one or more vehicle computing systems (e.g. for providing autonomous operation), one or more vehicle control systems, (e.g., for controlling acceleration, braking, steering, etc.), and/or the like. The data acquisition system(s) can acquire sensor data (e.g., LIDAR data, radar data, image data, etc.) associated with one or more objects (e.g., pedestrians, vehicles, etc.) that are proximate to the autonomous vehicle and/or sensor data associated with the vehicle path (e.g., path shape, boundaries, markings, etc.). The sensor data can include information that describes the location (e.g., in three-dimensional space relative to the autonomous vehicle) of points that correspond to objects within the surrounding environment of the autonomous vehicle (e.g., at one or more times). The data acquisition system(s) can provide such sensor data to the vehicle computing system.

In addition to the sensor data, the vehicle computing system can obtain map data that provides other detailed information about the surrounding environment of the autonomous vehicle. For example, the map data can provide information regarding: the identity and location of various roadways, road segments, buildings, or other items; the location and direction of traffic lanes (e.g. the boundaries, location, direction, etc. of a travel lane, parking lane, a turning lane, a bicycle lane, and/or other lanes within a particular travel way); traffic control data (e.g., the location and instructions of signage, traffic signals, and/or other traffic control devices); and/or any other map data that provides information that can assist the autonomous vehicle in comprehending and perceiving its surrounding environment and its relationship thereto.

The vehicle computing system can include one or more computing devices and include various subsystems that can cooperate to perceive the surrounding environment of the autonomous vehicle and determine a motion plan for controlling the motion of the autonomous vehicle. For instance, the vehicle computing system can include a perception system, a predication system, and a motion planning system. The vehicle computing system can receive and process the sensor data to generate an appropriate motion plan through the vehicle's surrounding environment.

The perception system can detect one or more objects that are proximate to the autonomous vehicle based on the sensor data. In particular, in some implementations, the perception system can determine, for each object, state data that describes a current state of such object. As examples, the state data for each object can describe an estimate of the object's: current location (also referred to as position); current speed/velocity; current acceleration; current heading; current orientation; size/footprint; class (e.g., vehicle class versus pedestrian class versus bicycle class, etc.); and/or other state information. In some implementations, the perception system can determine state data for each object over a number of iterations. In particular, the perception system can update the state data for each object at each iteration. Thus, the perception system can detect and track objects (e.g., vehicles, bicycles, pedestrians, etc.) that are proximate to the autonomous vehicle over time, and thereby produce a presentation of the world around an autonomous vehicle along with its state (e.g., a presentation of the objects within a scene at the current time along with the states of the objects).

The prediction system can receive the state data from the perception system and predict one or more future locations for each object based on such state data. For example, the prediction system can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system can determine a motion plan for the autonomous vehicle based at least in part on predicted one or more future locations for the object provided by the prediction system and/or the state data for the object provided by the perception system. Stated differently, given information about the classification and current locations of objects and/or predicted future locations of proximate objects, the motion planning system can determine a motion plan for the autonomous vehicle that best navigates the autonomous vehicle along the determined travel route relative to the objects at such locations.

As one example, in some implementations, the motion planning system can determine a cost function for each of one or more candidate motion plans for the autonomous vehicle based at least in part on the current locations and/or predicted future locations of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

Thus, given information about the classifications, current locations, and/or predicted future locations of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system then can provide the selected motion plan to a vehicle controller that controls one or more vehicle controls (e.g., actuators or other devices that control acceleration, steering, braking, etc.) to execute the selected motion plan.

More particularly, in some implementations, to provide various range object detection (e.g. longer range object detection), the vehicle computing system can use image data captured by one or more cameras onboard the autonomous vehicle (e.g. autonomous truck, etc.) along with one or more machine-learned models to detect and identify objects (e.g., vehicles, etc.) at a desired range (e.g., long range) ahead of the autonomous truck (e.g., up to 100 m, up to 200 m, etc.) and determine an estimate of distance or range to the detected objects (e.g., vehicles, etc.).

To do so, according to an aspect of the present disclosure, the vehicle computing system can include, employ, and/or otherwise leverage a model, such as a machine-learned model. For example, the machine-learned model can be or can otherwise include one or more various model(s) such as, for example, neural networks (e.g., deep neural networks), or other multi-layer non-linear models. Neural networks can include recurrent neural networks (e.g., long, short-term memory recurrent neural networks), feed-forward neural networks, convolutional neural networks, and/or other forms of neural networks.

For instance, supervised training techniques can be performed to train the model, for example, using available ground truth data including first-type camera data (e.g., wide field of view camera data, etc.) and LIDAR data and/or other type data that can provide range/distance (e.g., LIDAR ranges to the objects, etc.), to detect and identify objects (e.g., vehicles, etc.) and determine estimates of a range or distance to the detected objects. The vehicle computing system can input second-type camera data (e.g., narrow field of view camera data, etc.) into the machine-learned model and receive, as an output, data indicative of a estimated range to an identified object (e.g. vehicle, etc.) based on the training with the first-type camera data.

In particular, according to an aspect of the present disclosure, the machine-learned model can provide as output initial range estimate data wherein the range estimates are determined based on the first-type camera training data (e.g., wide field of view camera training data, etc.) and the initial range estimates can then be transformed based on one or more relationships between the first-type camera (e.g., wide field of view camera, etc.) and the second-type camera (e.g., narrow field of view camera, etc.) to provide actual range estimates to the detected objects (e.g., vehicles, etc.).

More particularly, the machine-learned model(s) can be trained using labeled ground truth data that is readily available (e.g., providing ranges to detected objects in wide field of view camera image data based in part on associated LIDAR, etc.) from one or more sources such that the machine-learned model can "learn" how far away an object may be from an autonomous vehicle based on how the object appears (e.g., object size, object number of pixels, etc.) in a wide field of view camera image. The machine-learned model can then provide as output range estimates for objects that are detected within the input image data based on how the objects appear in the image data and assuming that the input image data corresponds to wide field of view image data. For example, by training the machine-learned model using wide field of view camera data and LIDAR, the machine-learned model learns that objects that are a certain distance away, for example, fifty meters, in wide field of view image data appear to be a certain size. Thus, the machine-learned model can then provide range estimates based on the size that an object appears in the input image data, for example, up to a range of 50 m as provided by the wide field of view and LIDAR training data.

According to an aspect of the present disclosure, to provide longer range object detection (e.g., longer ranges than generally provided by LIDAR) without needing to retrain the machine-learned model and/or generate labels for ground truth data beyond what may be provided by LIDAR, cameras having a different field of view than provided in the training data (e.g., a narrow field of view camera, etc.) can be configured to capture image data of the environment around the autonomous vehicle. A narrow field of view camera, for example, can capture image data that optically enlarges or magnifies an area within a field of view that would be captured by a wide field of view camera. Thus, a narrow field of view camera can be used to detect and identify objects at a further distance than might be possible using a wide field of view camera.

More particularly, according to an aspect of the present disclosure, in some implementations, a machine-learned model trained to provide range estimates based on wide field of view image data can be provided with input image data from a narrow field of camera. By using image data from a narrow field of view camera, the machine-learned model can provide range estimates for objects that are at a greater distance/range than the range provided by the training data by transforming initial wide field of view range estimates to actual range estimates by using a transform from the wide field of view camera to the narrow field of view camera.

As an example, in some implementations, a machine-learned model can be trained using wide field of view image data labeled with LIDAR range data (e.g., providing ranges up to 50 m or the like). The trained machine-learned model learns that objects that are a certain size in the wide field of view image are a certain distance away, for example, fifty meters. A narrow field of view camera may then be configured to capture image data around (e.g., in front of, ahead of, etc.) an autonomous vehicle. The narrow field of view camera can allow for capturing an enlarged perspective within the field of view that would be provided by a wide field of view camera, thereby providing for object detection at a longer range than might be provided by the wide field of view camera. For example, using a narrow field of view camera, an object that may be one hundred meters away may appear in a narrow field of view camera image to correspond to the image size of an object that is fifty meters away in a wide field of view camera image. The trained machine-learned model can be provided with image data from the narrow field of view camera as input and the machine-learned model can identify objects in a narrow field of view image that correspond in size to objects that would appear in a wide field of view image. For example, the machine-learned model may identify an object that is at a range of one hundred meters in the narrow field of view image that corresponds in size to an object that would be at a range of fifty meters in a wide field of view image. The machine-learned model may then provide an initial range estimate of fifty meters for the identified object in the narrow field of view image (e.g., based on training with wide field of view camera image training data). According to an aspect of the present disclosure, one or more relationships between the wide field of view camera and the narrow field of view camera can be identified. The relationship(s) between the cameras can be used to transform the initial range estimate of fifty meters to the appropriate range estimate (e.g., actual range estimate) of one hundred meters, for example. The transformed range estimate can then be used in determining operation of the autonomous vehicle, such as in determining one or more motion plans for the autonomous vehicle, and/or the like.

According to the present disclosure, a variety of relationships between a first field of view camera (e.g., the camera used for training data) and a second field of view camera (e.g., the camera used for input for long range detection) can be used to transform an initial range estimate to an adjusted range estimate for use in operation of the autonomous vehicle. As an example, the relationship can be based on the focal length of the camera used in operation and the focal length associated with the training data. The machine-trained model can include data that is indicative of the focal length associated with the training data.

For example, according to one aspect of the present disclosure, a ratio of the focal lengths of the cameras may be used to transform the range estimates. In some implementations, for example, a machine-learned model can provide initial range estimates based on an assumption that it is a wide field of view and the initial range estimates can be transformed to the adjusted range estimates for the actual narrow field of view using the ratio of focal lengths between the wide field of view camera (e.g., used to capture the training data) and the narrow field of view camera (e.g., used in range detection operations of the vehicle). As one example, in some implementations, the initial range estimate can be multiplied by the ratio of the focal length of the narrow field of view camera to the focal length of the wide field of view camera.

The systems and methods described herein provide a number of technical effects and benefits. For instance, the vehicle computing system can locally (e.g., on board the autonomous vehicle) detect and identify vehicles at a longer range from the autonomous vehicle and provide for earlier adjustments to the operation of the autonomous vehicle accordingly, thereby achieving improved operation and driving safety of the autonomous vehicle. For example, by providing longer range object detection, the systems and methods of the present disclosure can provide for more accurate and timely object perception and motion planning. Additionally, by performing such operations onboard the autonomous vehicle, the vehicle computing system can avoid latency issues that arise from communicating with a remote computing system.

Additionally, the systems and methods described herein provide a technical effect and benefit of allowing a machine-learned model to be trained based on a first type of camera using large amounts of existing training data and then operate using image data from a second type of camera and still receive accurate range estimates beyond what the training data provides. In particular, the systems and methods described herein provide a technical effect and benefit of training a machine-learned model based on a first type of imagery (e.g., wide field of view images) that depicts objects within a range at which LIDAR-derived range data can be used to label the objects, while still enabling the machine-learned model to provide useful predictions on a second type of imagery (e.g., narrow field of view images) that depicts objects at a range at which LIDAR does not provide accurate range information. Thus, the systems and methods of the present disclosure extend the usefulness of short range LIDAR-derived training data to the long range problem.

Further, the systems and methods described herein allow for using a machine-learned model without the model having to be trained on every type of camera to be used in capturing image data. The systems and methods described herein can provide an additional benefit of providing for improved modularity by allowing for switching types of cameras (e.g., cameras having different fields of view) without having to retrain the machine-learned model.

The systems and methods described herein can also provide resulting improvements to vehicle computing technology tasked with operation of an autonomous vehicle. For example, aspects of the present disclosure can enable a vehicle computing system to more efficiently and accurately control an autonomous vehicle's motion by achieving improvements in object perception and vehicle response time provided by longer range vehicle detection.

With reference to the figures, example embodiments of the present disclosure will be discussed in further detail.

FIG. 1 depicts a block diagram of an example system 100 for controlling the navigation of an autonomous vehicle 102 according to example embodiments of the present disclosure. The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

The autonomous vehicle 102 can include one or more sensors 104, a vehicle computing system 106, and one or more vehicle controls 108. The vehicle computing system 106 can assist in controlling the autonomous vehicle 102. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 102 according to the motion path.

The vehicle computing system 106 can include one or more processors 130 and at least one memory 132. The one or more processors 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof. The memory 132 can store data 134 and instructions 136 which are executed by the processor 130 to cause vehicle computing system 106 to perform operations. In some implementations, the one or more processors 130 and at least one memory 132 may be comprised in one or more computing devices, such as computing device(s) 129, within the vehicle computing system 106.

In some implementations, vehicle computing system 106 can further include a positioning system 120. The positioning system 120 can determine a current position of the autonomous vehicle 102. The positioning system 120 can be any device or circuitry for analyzing the position of the autonomous vehicle 102. For example, the positioning system 120 can determine position by using one or more of inertial sensors, a satellite positioning system, based on IP address, by using triangulation and/or proximity to network access points or other network components (e.g., cellular towers, WiFi access points, etc.), and/or other suitable techniques for determining position. The position of the autonomous vehicle 102 can be used by various systems of the vehicle computing system 106.

As illustrated in FIG. 1, in some embodiments, the vehicle computing system 106 can include a perception system 110, a prediction system 112, and a motion planning system 114 that cooperate to perceive the surrounding environment of the autonomous vehicle 102 and determine a motion plan for controlling the motion of the autonomous vehicle 102 accordingly.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102.

As one example, for LIDAR system, the sensor data can include the location (e.g., in three-dimensional space relative to the LIDAR system) of a number of points that correspond to objects that have reflected a ranging laser. For example, LIDAR system can measure distances by measuring the Time of Flight (TOF) that it takes a short laser pulse to travel from the sensor to an object and back, calculating the distance from the known speed of light.

As another example, for RADAR system, the sensor data can include the location (e.g., in three-dimensional space relative to RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that are proximate to the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 approaches a possible impact with another object and/or deviates from a preferred pathway (e.g., a preapproved pathway).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116 that controls one or more vehicle controls 108 (e.g., actuators or other devices that control gas flow, acceleration, steering, braking, etc.) to execute the selected motion plan.

Each of the perception system 110, the prediction system 112, the motion planning system 114, and the vehicle controller 116 can include computer logic utilized to provide desired functionality. In some implementations, each of the perception system 110, the prediction system 112, the motion planning system 114, and the vehicle controller 116 can be implemented in hardware, firmware, and/or software controlling a general purpose processor. For example, in some implementations, each of the perception system 110, the prediction system 112, the motion planning system 114, and the vehicle controller 116 includes program files stored on a storage device, loaded into a memory, and executed by one or more processors. In other implementations, each of the perception system 110, the prediction system 112, the motion planning system 114, and the vehicle controller 116 includes one or more sets of computer-executable instructions that are stored in a tangible computer-readable storage medium such as RAM hard disk or optical or magnetic media.

Figure 2A:
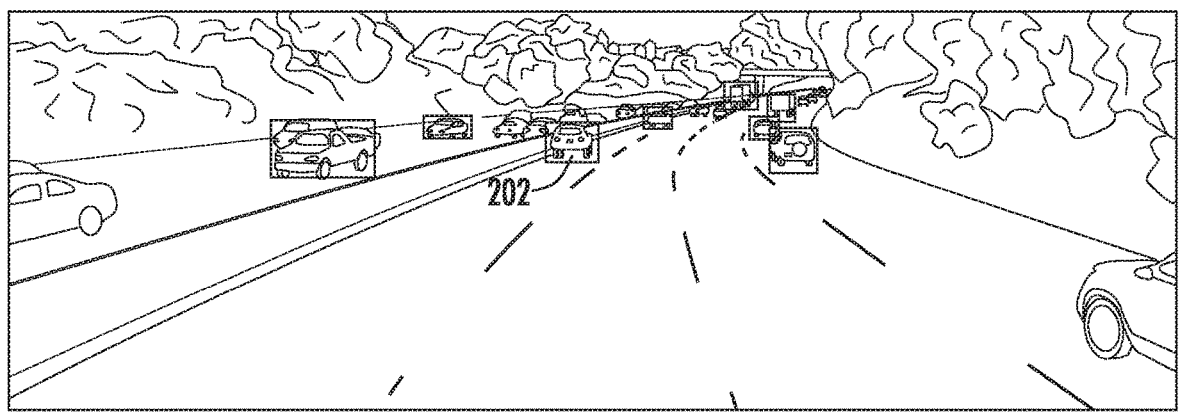
FIGS. 2A-2B depict example images using a wide field of view camera and a narrow field of view camera according to example embodiments of the present disclosure.
Figure 2B:
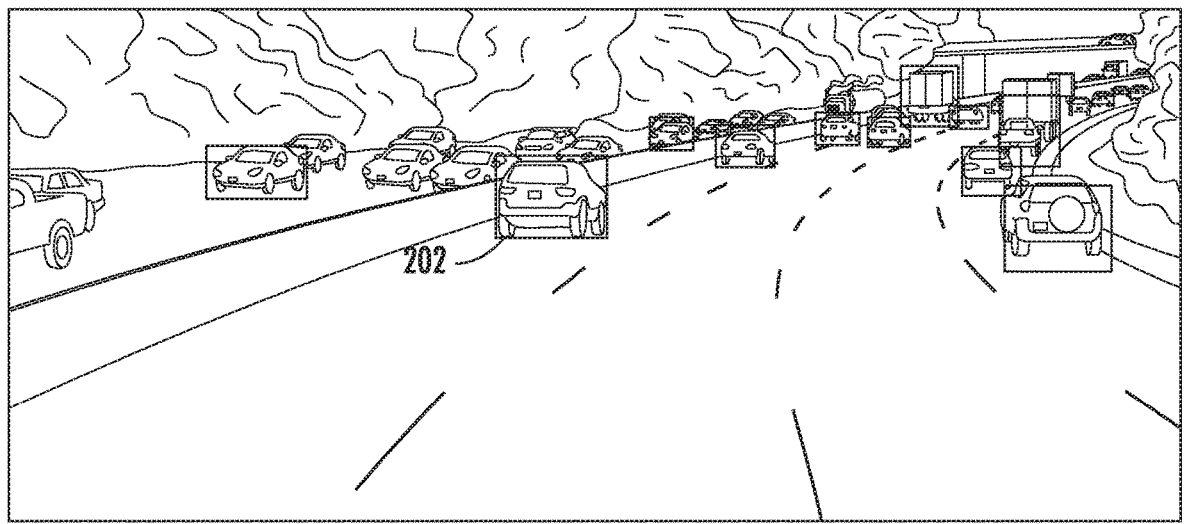

FIG. 2A depicts an example of an image captured using a wide field of view camera according to example embodiments of the present disclosure. FIG. 2B depicts an example image captured using a narrow field of view camera of part of the same scene as captured in the example wide field of view image of FIG. 2A according to example embodiments of the present disclosure. A narrow field of view camera, for example, can capture image data that optically enlarges or magnifies an area within a field of view that would be captured by a wide field of view camera. For example, as illustrated by FIG. 2A and FIG. 2B, the narrow field of view image of FIG. 2B enlarges or magnifies a portion of the wide field of view image of FIG. 2A. For example, vehicle 202 appears enlarged in the narrow field of view image of FIG. 2B as compared to the size of vehicle 202 in the wide field of view image of FIG. 2A. Thus, according to example aspects of the present disclosure, narrow field of view camera image data can be used to detect and identify objects at a further distance than may be provided by wide field of view camera image data. For example, using a narrow field of view camera, an object that may be first distance (e.g. 100 meters, etc.) away may appear in the narrow field of view image to correspond to the image size of an object that would be a second distance (e.g., fifty meters, etc.) away in a wide field of view camera image.

Figure 3A:
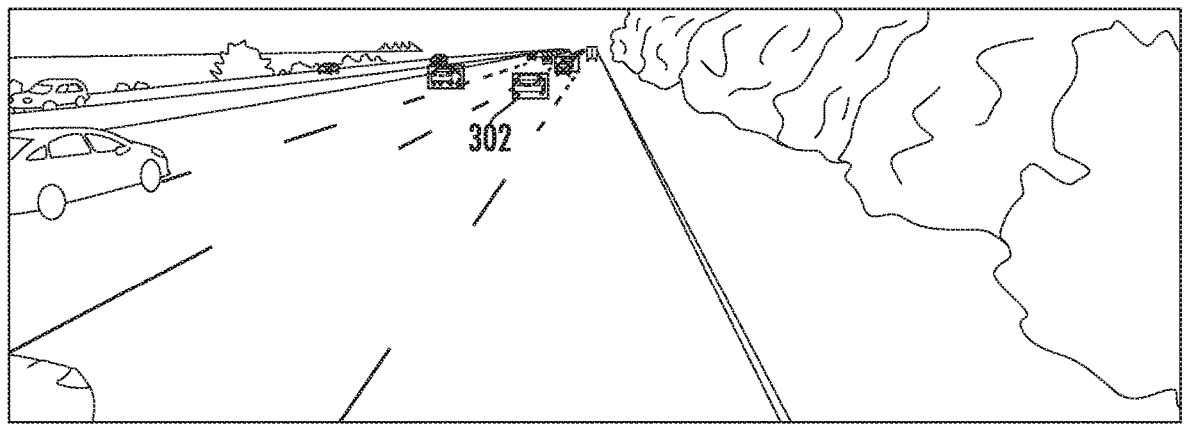
FIGS. 3A-3B depict example images using a wide field of view camera and a narrow field of view camera according to example embodiments of the present disclosure.
Figure 3B:
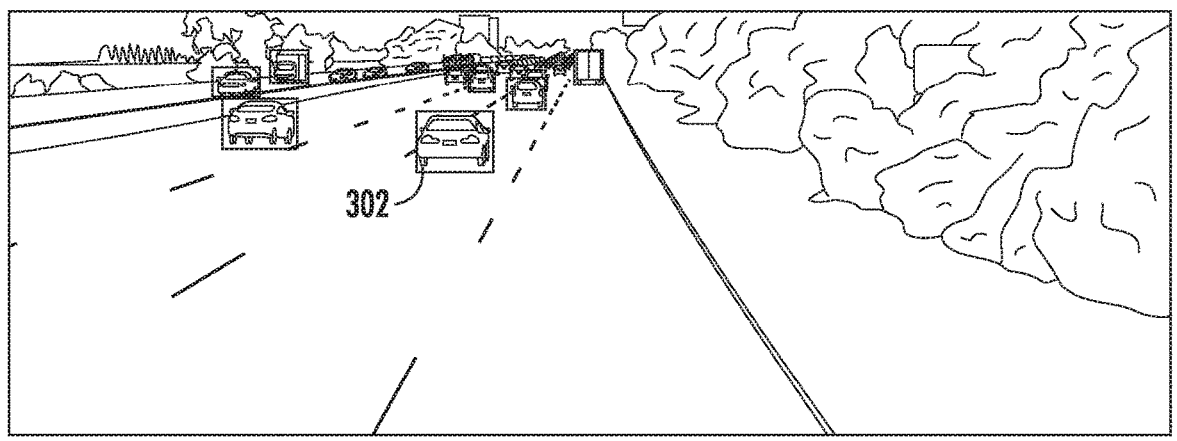

FIG. 3A depicts an example camera image captured using a wide field of view camera according to example embodiments of the present disclosure. FIG. 3B depicts an example image captured using a narrow field of view camera of part of the same scene as captured in the example wide field of view image of FIG. 3A according to example embodiments of the present disclosure. As illustrated by FIG. 3A and FIG. 3B, the narrow field of view image of FIG. 3B enlarges or magnifies a portion of the wide field of view image of FIG. 3A. For example, vehicle 302 appears enlarged in the narrow field of view image of FIG. 3B as compared to the size of vehicle 302 shown in the wide field of view image of FIG. 3A.

Figure 4A:
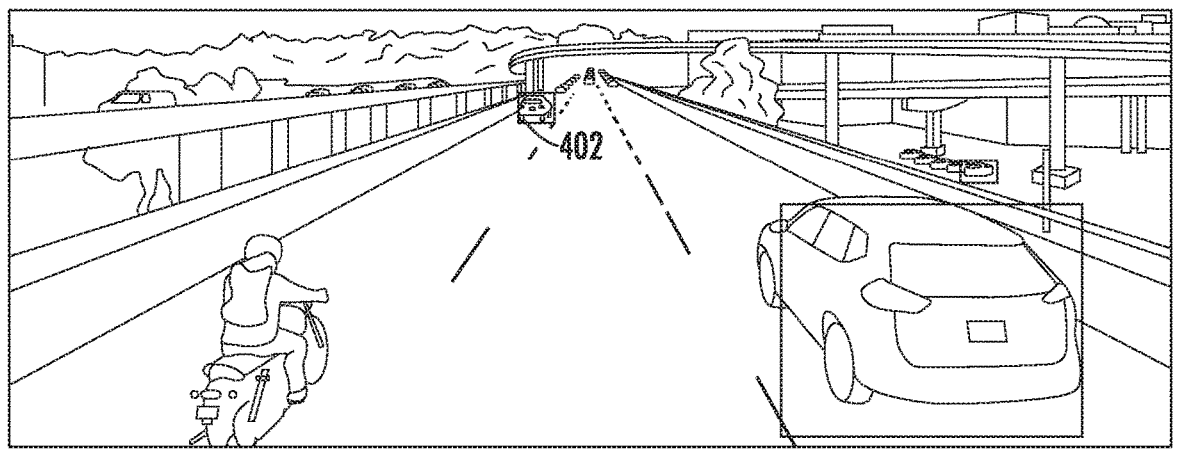
FIGS. 4A-4B depict example images using a wide field of view camera and a narrow field of view camera according to example embodiments of the present disclosure.
Figure 4B:
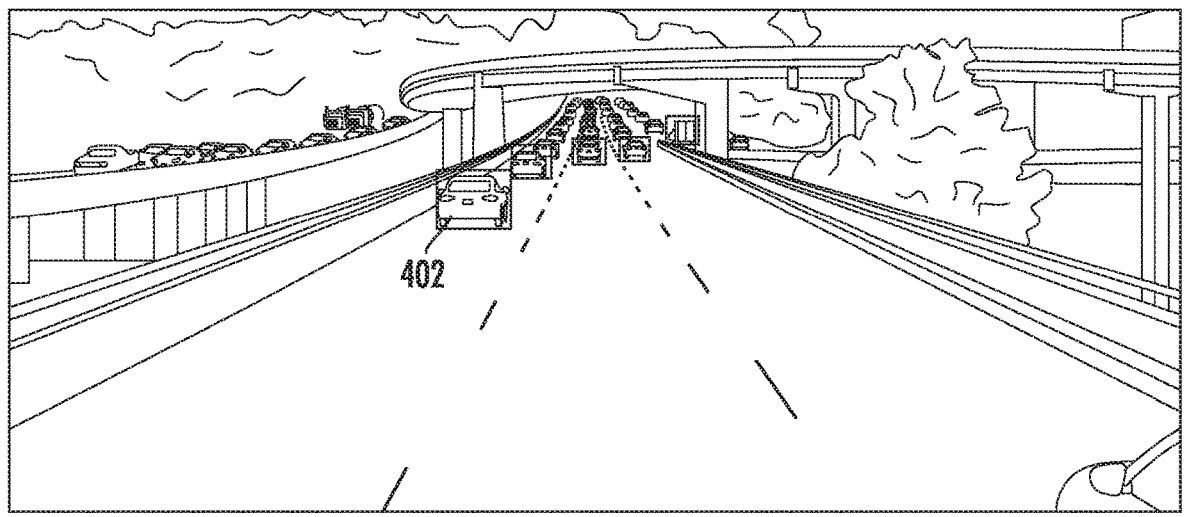

FIG. 4A depicts an example camera image using a wide field of view camera according to example embodiments of the present disclosure. FIG. 4B depicts an example image using a narrow field of view camera according to example embodiments of the present disclosure. As illustrated by FIG. 4A and FIG. 4B, the narrow field of view image of FIG. 4B enlarges or magnifies a portion of the wide field of view image of FIG. 4A. For example, vehicle 402 appears enlarged in the narrow field of view image of FIG. 4B as compared to the size of vehicle 402 in the wide field of view image of FIG. 4A.

Figure 5:
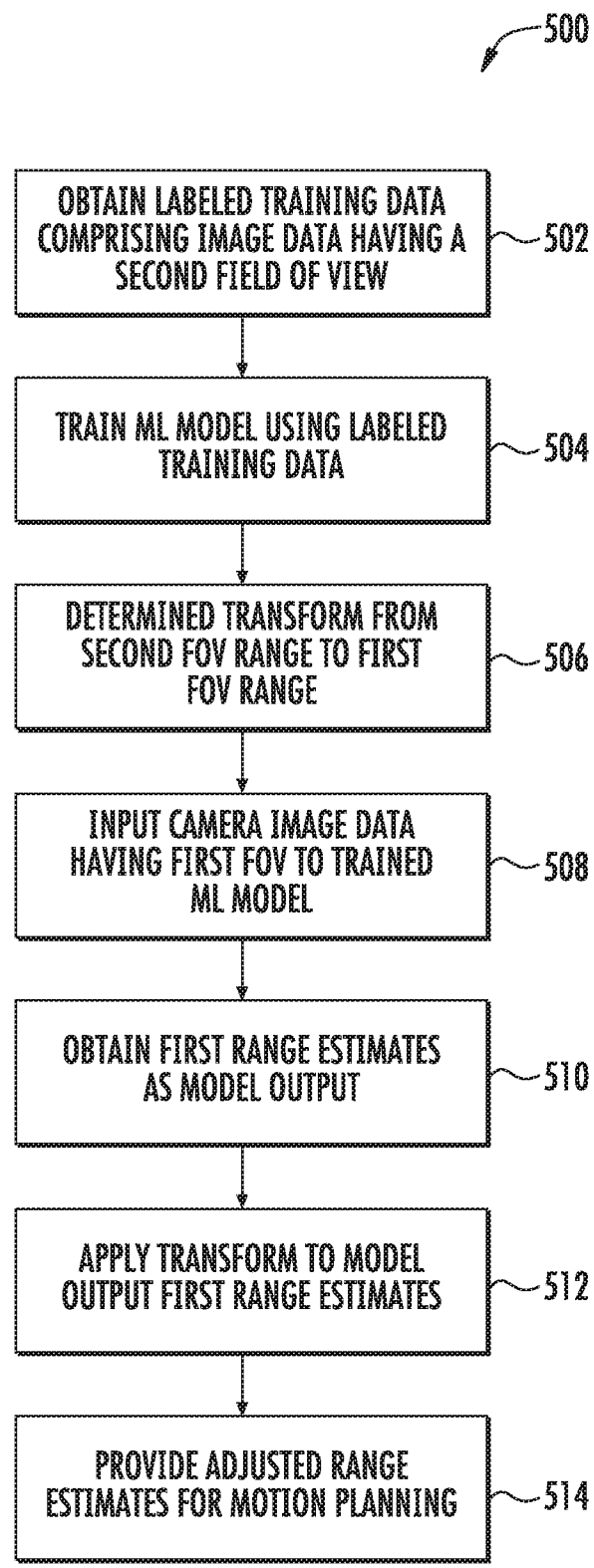
FIG. 5 depicts a flowchart diagram of example operations for long range object detection according to example embodiments of the present disclosure.

FIG. 5 depicts a flowchart diagram of example operations 500 for longer range object detection according to example embodiments of the present disclosure. One or more portion(s) of the operations 500 can be implemented by one or more computing devices such as, for example, the vehicle computing system 106 of FIG. 1, the computing system 702 or 730 of FIG. 7, or the like. Moreover, one or more portion(s) of the operations 500 can be implemented as an algorithm on the hardware components of the device(s) described herein (e.g., as in FIGS. 1 and 7) to, for example, provide for object detection at various ranges during autonomous vehicle operation.

At 502, one or more computing devices included within a computing system (e.g., computing system 106, 702, 730, or the like) can obtain labeled training data for use in training a machine-learned model for object detection and range estimation. The labeled training data can include image data comprising a plurality of images having a second field of view (e.g., image data captured using a camera having a second field of view, such as a wide field of view camera). The training data (e.g., image data) can be labeled with ranges for objects detected within the image data. For example, in some implementations, objects detected within the image data can be labeled with ranges based on LIDAR sensor data.

At 504, the computing system can train one or more machine-learning models using the labeled training data to provide for object detection and range estimation for the detected objects.

At 506, the computing system can determine a range estimate transform to provide for transforming a first range estimate having a range based on a second field of view to a transformed range estimate based on a first field of view. In some implementations, the range estimate transform can be determined based on one or more relationships between the first field of view and the second field of view (e.g., relationship between a first field of view camera and a second field of view camera). For example, in some implementations, the range estimate transform can be determined based in part on the relationship between the focal length of the first field of view and the focal length of the second field of view.

In particular, in some implementations, the one or more machine-learned models may be trained to provide object detection and range estimation based on image data having a second field of view, but may be implemented to provide range estimations based on image data from one or more cameras having a first field of view. As such, the range estimates generated by the one or more machine-learned models can be transformed from the second field of view range to the first field of view range by applying the range estimate transform to the range estimates generated by the one or more machine-learned models.

At 508, image data can be obtained from one or more cameras providing a first field of view (e.g., one or more cameras associated with an autonomous vehicle) and the image data can be provided as input to one of the one or more trained machine-learned models.

At 510, the machine-learned model can generate as output first range estimates for objects detected in the image data provided as input. For example, the machine-learned model can provide range estimates for detected objects based on an assumption that the input image data has the second field of view (e.g., that the image data was captured using a camera having the second field of view).

At 512, the computing system can apply the range estimate transform to the first range estimated provided as output from the machine-learned model. For example, the range estimate transform can be applied to the first range estimates provide by the machine-learned model based on the second field of view to transform the first range estimates to transformed (or actual) range estimates associated with the first field of view (e.g., the field of view of the camera providing the input image data).

At 514, the transformed range estimates for the detected objects can be provided, for example, to a vehicle computing system, to provide for motion planning for the autonomous vehicle.

In some implementations, blocks 502-504 can be performed by a first computing system (e.g., the computing system 700 as illustrated in FIG. 7), while blocks 506-514 can be performed by a second computing system (e.g., the vehicle computing system of 106 as illustrated in FIG. 1). Other combinations or divisions of block performance can be utilized as well.

Figure 6:
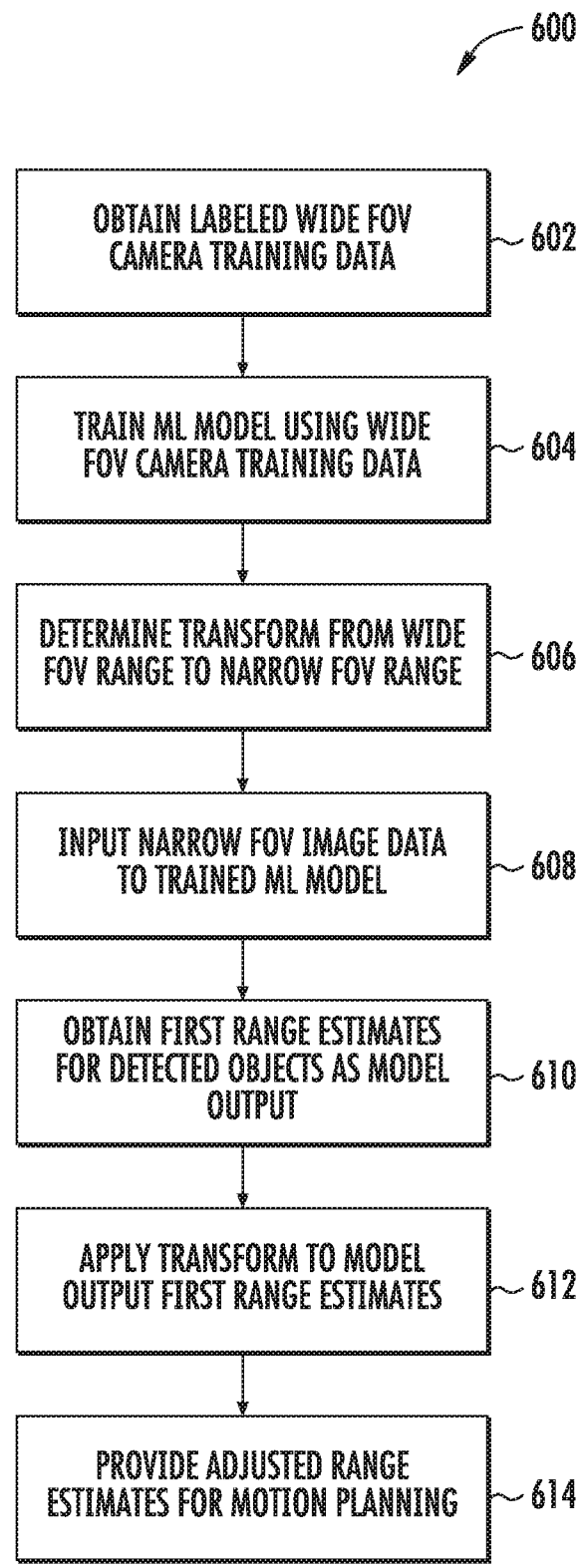
FIG. 6 depicts a flowchart diagram of example operations for long range object detection according to example embodiments of the present disclosure.

FIG. 6 depicts a flowchart diagram of example operations 600 for longer range object detection according to example embodiments of the present disclosure. One or more portion(s) of the operations 600 can be implemented by one or more computing devices such as, for example, the vehicle computing system 106 of FIG. 1, the computing system 702 or 730 of FIG. 7, or the like. Moreover, one or more portion(s) of the operations 600 can be implemented as an algorithm on the hardware components of the device(s) described herein (e.g., as in FIGS. 1 and 7) to, for example, provide for object detection at various ranges during autonomous vehicle operation.

At 602, one or more computing devices included within a computing system (e.g., computing system 106, 702, 730, or the like) can obtain available labeled training data for use in training a machine-learned model for object detection and range estimation. The labeled training data can include image data comprising a plurality of images having a wide field of view (e.g., image data captured using a camera having a wide field of view). The training data (e.g., image data) can be labeled with ranges for objects detected within the image data. For example, in some implementations, objects detected within the image data can be labeled with ranges based on LIDAR sensor data.

At 604, the computing system can train one or more machine-learning models using the labeled training data to provide for object detection and range estimation. For example, in some implementations, to train one or more machine-learning models, a training computing system can input a first portion of a training dataset (e.g., a first portion—the image data—of a set of ground-truth data comprising wide field of view image data and associated object range labels, etc.) into the machine-learning models to be trained. In response to receipt of such first portion, the machine-learning model can output detected objects and range estimates. This output of the machine-learning model can predict the second portion of the training dataset (e.g., the remainder of the set of ground-truth data—the associated object ranges). After such prediction, the training computing system can apply or otherwise determine a loss function that compares the object detections and associated range estimates output by the machine-learned model to the remainder of the ground-truth data (e.g., ground-truth labels) which the model attempted to predict. The training computing system then can backpropagate the loss function through the model to train the model (e.g., by modifying one or more weights associated with the model). This process of inputting ground-truth data, determining a loss function, and backpropagating the loss function through the model can be repeated numerous times as part of training the model. For example, the process can be repeated for each of numerous sets of ground-truth data provided within the training dataset.

At 606, the computing system can determine a range estimate transform to provide for transforming a first range estimate having a range based on an assumption of a wide field of view to a transformed range estimate based on a narrow field of view. In some implementations, the range estimate transform can be determined based on one or more relationships between the narrow field of view and the wide field of view (e.g., relationships between a narrow field of view camera and a wide field of view camera). For example, in some implementations, the range estimate transform can be determined based in part on the relationship between the focal length of the narrow field of view camera and the focal length of the wide field of view camera.

In particular, in some implementations, the one or more machine-learned models may be trained to provide object detection and range estimation based on image data having a wide field of view, but may be implemented to provide range estimations based on image data from one or more cameras having a narrow field of view. As such, the range estimates generated by the one or more machine-learned models can be transformed from the wide field of view range to the narrow field of view range by applying the range estimate transform to the range estimates generated by the one or more machine-learned models.

At 608, image data can be obtained from one or more cameras providing a narrow field of view (e.g., one or more cameras associated with an autonomous vehicle) and the image data can be provided as input to one of the one or more trained machine-learned models.

At 610, the machine-learned model can generate as output first range estimates for objects detected in the input image data. For example, the machine-learned model can provide range estimates for detected objects based on an assumption that the input image data was captured using the wide field of view (e.g., that the image data was captured using a wide field of view camera).

At 612, the computing system can apply the range estimate transform to the first range estimated provided as output from the machine-learned model. For example, the range estimate transform can be applied to the first range estimates output by the machine-learned model that are based on a wide field of view to transform the first range estimates to transformed (or actual) range estimates associated with the narrow field of view (e.g., the narrow field of view of the camera providing the input image data).

At 614, the transformed range estimates for the detected objects can be provided, for example, to a vehicle computing system, to provide for motion planning for the autonomous vehicle.

In some implementations, blocks 602-604 can be performed by a first computing system (e.g., the computing system 700 as illustrated in FIG. 7), while blocks 606-614 can be performed by a second computing system (e.g., the vehicle computing system of 106 as illustrated in FIG. 1). Other combinations or divisions of block performance can be utilized as well.

Although FIGS. 5 and 6 depict steps performed in a particular order for purposes of illustration and discussion, the methods of the present disclosure are not limited to the particularly illustrated order or arrangement. The various steps of the methods 500 and 600 can be omitted, rearranged, combined, and/or adapted in various ways without deviating from the scope of the present disclosure.

FIG. 7 depicts a block diagram of an example computing system 700 according to example embodiments of the present disclosure. The example system 700 includes a computing system 702 and a machine learning computing system 730 that are communicatively coupled over a network 780.

In some implementations, the computing system 702 can perform object detection for autonomous vehicle motion at various ranges, for example, for use in motion planning for the autonomous vehicle. In some implementations, the computing system 702 can be included in an autonomous vehicle. For example, the computing system 702 can be on-board the autonomous vehicle. In other implementations, the computing system 702 is not located on-board the autonomous vehicle. For example, the computing system 702 can operate offline to perform object detection. The computing system 702 can include one or more distinct physical computing devices.

The computing system 702 includes one or more processors 712 and a memory 1114. The one or more processors 712 can be any suitable processing device (e.g., a processor core, a microprocessor, an ASIC, a FPGA, a controller, a microcontroller, etc.) and can be one processor or a plurality of processors that are operatively connected. The memory 714 can include one or more non-transitory computer-readable storage media, such as RAM, ROM, EEPROM, EPROM, one or more memory devices, flash memory devices, etc., and combinations thereof.

The memory 714 can store information that can be accessed by the one or more processors 712. For instance, the memory 714 (e.g., one or more non-transitory computer-readable storage mediums, memory devices) can store data 716 that can be obtained, received, accessed, written, manipulated, created, and/or stored. The data 716 can include, for instance, sensor data including image data, map data, data identifying detected objects including current object states and predicted object locations and/or trajectories, autonomous vehicle and/or context features, motion plans, machine-learned models, rules, etc. as described herein. In some implementations, the computing system 702 can obtain data from one or more memory device(s) that are remote from the system 702.

The memory 714 can also store computer-readable instructions 718 that can be executed by the one or more processors 712. The instructions 718 can be software written in any suitable programming language or can be implemented in hardware. Additionally, or alternatively, the instructions 718 can be executed in logically and/or virtually separate threads on processor(s) 712.

For example, the memory 714 can store instructions 718 that when executed by the one or more processors 712 cause the one or more processors 712 to perform any of the operations and/or functions described herein, including, for example, operations of FIGS. 5-6.

According to an aspect of the present disclosure, the computing system 702 can store or include one or more machine-learned models 710. As examples, the machine-learned models 710 can be or can otherwise include various machine-learned models such as, for example, neural networks (e.g., deep neural networks), support vector machines, decision trees, random forest models, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

In some implementations, the computing system 702 can receive the one or more machine-learned models 710 from the machine learning computing system 730 over network 780 and can store the one or more machine-learned models 710 in the memory 714. The computing system 702 can then use or otherwise implement the one or more machine-learned models 710 (e.g., by processor(s) 712). In particular, the computing system 702 can implement the machine learned model(s) 710 to provide for object detection and range estimation in the environment around an autonomous vehicle.

For example, in some implementations, the computing system 702 can employ the machine-learned model(s) 710 by inputting sensor data such as image data from a camera into the machine-learned model(s) 710 and receiving a prediction of the range of objects detected within the image data as an output of the machine-learned model(s) 710.

The machine learning computing system 730 includes one or more processors 732 and a memory 734. The one or more processors 732 can be any suitable processing device (e.g., a processor core, a microprocessor, an ASIC, a FPGA, a controller, a microcontroller, etc.) and can be one processor or a plurality of processors that are operatively connected. The memory 734 can include one or more non-transitory computer-readable storage media, such as RAM, ROM, EEPROM, EPROM, one or more memory devices, flash memory devices, etc., and combinations thereof.

The memory 734 can store information that can be accessed by the one or more processors 732. For instance, the memory 734 (e.g., one or more non-transitory computer-readable storage mediums, memory devices) can store data 736 that can be obtained, received, accessed, written, manipulated, created, and/or stored. The data 736 can include, for instance, sensor data including image data, map data, data identifying detected objects including current object states and predicted object locations and/or trajectories, motion plans, autonomous vehicle features, context features, driving log data, machine-learned models, model training data, rules, etc. as described herein. In some implementations, the machine learning computing system 730 can obtain data from one or more memory device(s) that are remote from the system 730.

The memory 734 can also store computer-readable instructions 738 that can be executed by the one or more processors 732. The instructions 738 can be software written in any suitable programming language or can be implemented in hardware. Additionally, or alternatively, the instructions 738 can be executed in logically and/or virtually separate threads on processor(s) 732.

For example, the memory 734 can store instructions 738 that when executed by the one or more processors 732 cause the one or more processors 732 to perform any of the operations and/or functions described herein, including, for example, operations of FIGS. 5-6.

In some implementations, the machine learning computing system 730 includes one or more server computing devices. If the machine learning computing system 730 includes multiple server computing devices, such server computing devices can operate according to various computing architectures, including, for example, sequential computing architectures, parallel computing architectures, or some combination thereof.

In addition or alternatively to the model(s) 710 at the computing system 702, the machine learning computing system 730 can include one or more machine-learned models 740. As examples, the machine-learned models 740 can be or can otherwise include various machine-learned models such as, for example, neural networks (e.g., deep neural networks), support vector machines, decision trees, random forest models, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

As an example, the machine learning computing system 730 can communicate with the computing system 702 according to a client-server relationship. For example, the machine learning computing system 730 can implement the machine-learned models 740 to provide a service to the computing system 702. For example, the service can provide an autonomous vehicle motion planning service.

Thus, machine-learned models 710 can be located and used at the computing system 702 and/or machine-learned models 740 can be located and used at the machine learning computing system 730.

In some implementations, the machine learning computing system 730 and/or the computing system 702 can train the machine-learned models 710 and/or 740 through use of a model trainer 760. The model trainer 760 can train the machine-learned models 710 and/or 740 using one or more training or learning algorithms. One example training technique is backwards propagation of errors. In some implementations, the model trainer 760 can perform supervised training techniques using a set of labeled training data. In other implementations, the model trainer 760 can perform unsupervised training techniques using a set of unlabeled training data. The model trainer 760 can perform a number of generalization techniques to improve the generalization capability of the models being trained. Generalization techniques include weight decays, dropouts, or other techniques.

In particular, the model trainer 760 can train a machine-learned model 710 and/or 740 based on one or more sets of training data 762. The training data 762 can include, for example, image data which can include labels for ranges based on one or more types of sensor data (e.g. LIDAR sensor data), and/or the like. The model trainer 760 can be implemented in hardware, firmware, and/or software controlling one or more processors.

The computing system 702 can also include a network interface 724 used to communicate with one or more systems or devices, including systems or devices that are remotely located from the computing system 702. The network interface 724 can include any circuits, components, software, etc. for communicating with one or more networks (e.g., 780). In some implementations, the network interface 724 can include, for example, one or more of a communications controller, receiver, transceiver, transmitter, port, conductors, software, and/or hardware for communicating data. Similarly, the machine learning computing system 730 can include a network interface 764.

The network(s) 780 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 780 can be accomplished, for instance, via a network interface using any type of protocol, protection scheme, encoding, format, packaging, etc.

FIG. 7 illustrates one example computing system 700 that can be used to implement the present disclosure. Other computing systems can be used as well. For example, in some implementations, the computing system 702 can include the model trainer 760 and the training dataset 762. In such implementations, the machine-learned models 710 can be both trained and used locally at the computing system 702. As another example, in some implementations, the computing system 702 is not connected to other computing systems.

In addition, components illustrated and/or discussed as being included in one of the computing systems 702 or 730 can instead be included in another of the computing systems 702 or 730. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A system comprising:
   a camera providing a first field of view;
   a machine-learned model that has been trained to generate object detection range estimates based at least in part on training data representing image data having a second field of view different from the first field of view; and
   a computing system comprising:
     one or more processors; and
     memory including instructions that, when executed by the one or more processors, cause the one or more processors to perform operations, the operations comprising:
       obtaining image data from the camera;
       inputting the image data from the camera to the machine-learned model;
       obtaining a first range estimate as an output of the machine-learned model, wherein the first range estimate represents estimates for the second field of view;
       generating a transformed range estimate by applying a range estimate transform to the first range estimate output from the machine-learned model, wherein the range estimate transform transforms the first range estimate into the transformed range estimate based at least in part on a ratio of focal lengths between the second field of view associated with the training data and the first field of view associated with the camera; and
       providing the transformed range estimate for use in controlling operation of an autonomous vehicle.

2. The system of claim 1 wherein the range estimate transform provides a transformation from a second field of view range to a first field of view range.

3. The system of claim 1 wherein the image data from the camera comprises image data that depicts objects in front of the autonomous vehicle.

4. The system of claim 1 wherein the transformed range estimate provides range estimates for detected objects at ranges greater than 100 meters.

5. The system of claim 1 wherein the image data from the camera providing the first field of view comprises an enlarged view of an area within the second field of view.

6. The system of claim 1 wherein the training data comprises objects in the image data having the second field of view labeled with ground-truth range data generated by a LIDAR system.

7. The system of claim 1 wherein the camera comprises a narrow field of view camera, the first field of view comprises a narrow field of view, the training data comprises image data that has a wide view of view, and the training data comprises image data collected by a wide field of view camera.

8. A computer-implemented method for object detection comprising:
 obtaining, by a computing system comprising one or more computing devices, image data from a camera providing a first field of view;
 inputting, by the computing system, the image data from the camera to a machine-learned model that has been trained to generate object detection range estimates based at least in part on training data representing image data having a second field of view different from the first field of view;
 obtaining, by the computing system, a first range estimate as an output of the machine-learned model, wherein the first range estimate represents an estimate for the second field of view;
 generating, by the computing system, a transformed range estimate by applying a range estimate transform to the first range estimate output from the machine-learned model, wherein the range estimate transform transforms the first range estimate into the transformed range estimate based at least in part on a ratio of focal lengths between the second field of view associated with the training data and the first field of view associated with the camera; and
 providing, by the computing system, the transformed range estimate to a motion planning system for use in determining operation of an autonomous vehicle.

9. The computer-implemented method of claim 8 wherein the range estimate transform provides a transformation from a second field of view range to a first field of view range.

10. The computer-implemented method of claim 8 wherein the image data from the camera comprises image data that depicts objects in front of the autonomous vehicle.

11. The computer-implemented method of claim 8 wherein the transformed range estimate provides a range estimate for a detected objects at a range greater than 100 meters.

12. The computer-implemented method of claim 8 wherein the image data from the camera providing the first field of view comprises an enlarged view of an area within the second field of view.

13. The computer-implemented method of claim 8 wherein the training data comprises objects in image data having the second field of view labeled with ground-truth range data generated by a LIDAR system.

14. An autonomous vehicle comprising:
 a camera providing a first field of view;
 a machine-learned model that has been trained to generate object detection range estimates based at least in part on training data representing image data having a second field of view different from the first field of view; and
 a vehicle computing system comprising:
 one or more processors; and
 memory including instructions that, when executed by the one or more processors, cause the one or more processors to perform operations, the operations comprising:
 obtaining image data from the camera;
 inputting the image data to the machine-learned model;
 obtaining a first range estimate as an output of the machine-learned model, wherein the first range estimate represents an estimate for the second field of view;
 generating a transformed range estimate by applying a range estimate transform to the first range estimate output from the machine-learned model, wherein the range estimate transform transforms the first range estimate into the transformed range estimate based at least in part on a ratio of focal lengths between the second field of view associated with the training data and the first field of view associated with the camera; and
 providing the transformed range estimate to a motion planning system for use in determining operation of the autonomous vehicle.

15. The autonomous vehicle of claim 14 wherein the range estimate transform provides a transformation from a second field of view range to a first field of view range.

16. The autonomous vehicle of claim 14 wherein the image data from the camera providing the first field of view comprises an enlarged view of an area within the second field of view.

17. The autonomous vehicle of claim 14 wherein the training data comprises objects in image data having the second field of view labeled with ground-truth range data generated by a LIDAR system.

* * * * *